(12) United States Patent
Iwanaga

(10) Patent No.: US 7,556,115 B2
(45) Date of Patent: Jul. 7, 2009

(54) VEHICLE BODY COOLING STRUCTURE FOR MOTORCYCLE AND MOTORCYCLE

(75) Inventor: Sadamu Iwanaga, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 441 days.

(21) Appl. No.: 11/469,761

(22) Filed: Sep. 1, 2006

(65) Prior Publication Data

US 2008/0289893 A1 Nov. 27, 2008

(30) Foreign Application Priority Data

Sep. 1, 2005 (JP) .............................. 2005-253512

(51) Int. Cl.
*B62K 11/00* (2006.01)

(52) U.S. Cl. ...................... 180/229; 180/219; 180/68.1; 296/78.1

(58) Field of Classification Search ................. 180/229, 180/219, 68.1; 296/78.1
See application file for complete search history.

(56) References Cited

U.S. PATENT DOCUMENTS

| 4,911,494 | A | * | 3/1990 | Imai et al. .................. 296/78.1 |
| 5,176,111 | A | * | 1/1993 | Nakamura et al. ........ 123/41.01 |
| 5,301,767 | A | * | 4/1994 | Shiohara .................... 180/219 |
| 5,323,869 | A | * | 6/1994 | Kurayoshi et al. .......... 180/219 |
| 5,490,573 | A | * | 2/1996 | Hagiwara et al. .......... 180/68.1 |
| 5,577,570 | A | * | 11/1996 | Shiohara et al. ............. 180/219 |
| 6,290,017 | B1 | * | 9/2001 | Ito .............................. 180/227 |
| 6,409,783 | B1 | * | 6/2002 | Miyajima et al. .......... 55/385.3 |
| 6,619,415 | B1 | * | 9/2003 | Hasumi et al. ............. 180/68.1 |
| 6,889,789 | B2 | * | 5/2005 | Kurayoshi et al. .......... 180/219 |
| 7,270,207 | B2 | * | 9/2007 | Idei et al. .................... 180/68.3 |
| 2004/0124031 | A1 | * | 7/2004 | Tanabe et al. ............... 180/309 |
| 2004/0129467 | A1 | | 7/2004 | Tsuruta et al. |

FOREIGN PATENT DOCUMENTS

| EP | 1314635 A2 | 5/2008 |
| JP | 58188720 | 4/1982 |
| JP | 61075019 | 4/1986 |
| JP | 02-128972 | 5/1990 |

OTHER PUBLICATIONS

European Search Report; dated Dec. 30, 2008; 6 pages.

* cited by examiner

*Primary Examiner*—Lesley D Morris
*Assistant Examiner*—Michael R Stabley
(74) *Attorney, Agent, or Firm*—Knobbe, Martens, Olson & Bear, LLP

(57) ABSTRACT

A vehicle body cooling structure for a motorcycle comprises a cooling air passage that extends between an engine and a fuel tank in the front-and-rear direction. A cowling covers the front part of the vehicle body, which contains the engine. The vehicle body cooling structure also comprises a heat blocking member that covers an upper part of the engine. The cooling air passage is separated into an engine side cooling air passage and a fuel tank side cooling air passage by the heat blocking member.

12 Claims, 17 Drawing Sheets

US 7,556,115 B2

VEHICLE BODY COOLING STRUCTURE FOR MOTORCYCLE AND MOTORCYCLE

CROSS-REFERENCE TO RELATED APPLICATIONS

This application claims the priority benefit of Japanese Patent Application No. 2005-253512, filed Sep. 1, 2005, which is hereby incorporated by reference in its entirety.

BACKGROUND OF THE INVENTION

1. Field of the Invention

The present application generally relates to a motorcycle and a vehicle body cooling structure for a motorcycle that redirects into a space between an engine and a fuel tank airflow created during forward movement of the vehicle.

2. Description of the Related Art

Motorcycles can feature a cowling that covers the front part of the vehicle body. Some of these cowlings include a ventilating structure that directs airflow created during movement of the motorcycle to the inside of the cowling. The ventilating structure directs the airflow between the engine and the fuel tank and other components inside the cowling. The airflow sweeps the air heated by the engine out of the region of the fuel tank. Thus, the fuel tank is less likely to be heated by the engine and an associated radiator.

A conventional motorcycle body cooling structure is disclosed in Japanese Patent No. 2,694,905 (pp. 2-3, FIG. 1), for example. In this arrangement, a structure introduces airflow produced by movement of the motorcycle through an air introduction opening formed at the front end of a cowling. Inside the cowling, the airflow is directed into a space between an engine and a fuel tank. The relatively low-temperature airflow is directed to a location below the bottom of the fuel tank or its vicinity. The airflow is discharged from within the cowling to the rear together with air warmed by a radiator and the engine.

In such constructions, however, the airflow is created by forward movement of the vehicle and a slow moving vehicle will not generate sufficient airflow to adequately reduce the impact of engine heat on the fuel tank. In other words, there is a possibility that the lower surface of the fuel tank will be warmed when the amount of the airflow is decreased when the vehicle is running at a low speed. In some configurations, a heat insulator has been attached to the lower surface of the fuel tank. The heat insulator can reduce the transmission of engine-generated heat to the fuel tank. If, however, the motorcycle is operated at low speeds for a sufficient period of time, then the entire lower part of the fuel tank, including the heat insulator, still may be heated.

In addition, relatively high-temperature air in the engine region sometimes rises due to a negative pressure region created behind a wind screen during normal operating speeds, especially at highway speeds. Accordingly, it is possible that the relatively high-temperature air will increase the temperature of the lower surface of the fuel tank.

SUMMARY OF THE INVENTION

Thus, one aspect of an embodiment of the present invention involves a recognition of similarity of heat evacuation difficulties for the two operating conditions. Another aspect of an embodiment of the present invention therefore attempts to resolve the heat evacuation difficulties in both operating conditions.

One aspect of an embodiment of an invention comprises a vehicle body cooling structure for a motorcycle. The motorcycle comprises an engine, a fuel tank disposed above the engine, a cooling air passage extending between the engine and the fuel tank in the front-and-rear direction, and a vehicle body cover covering at least the front part of the vehicle body, including the engine. The vehicle body cover has a heat blocking member that covers the upper part of the engine. The cooling air passage is separated into an engine side cooling air passage and a fuel tank side cooling air passage by the heat blocking member.

BRIEF DESCRIPTION OF THE DRAWINGS

These and other features, aspects and advantages will now be described with reference to drawings of a preferred embodiment. The drawings comprise the following figures.

DETAILED DESCRIPTION OF THE PREFERRED EMBODIMENT

Figure 1:
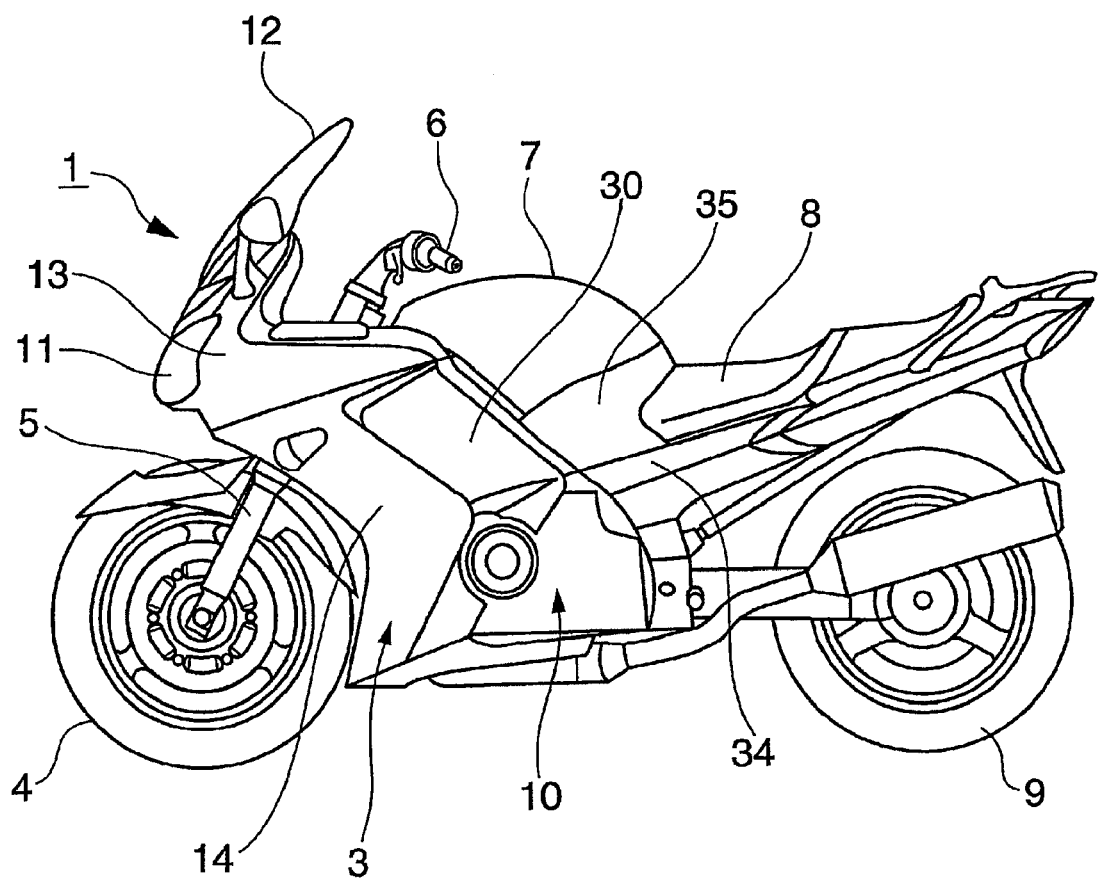
FIG. 1 is a side view of a motorcycle comprising a vehicle body cooling structure that is arranged and configured in accordance with certain features, aspects and advantages of an embodiment of the present invention.

FIG. 1 is a side view of a motorcycle 1 comprising a cooling structure for a vehicle body that is arranged and configured in accordance with certain features, aspects and advantages of the present invention. The motorcycle 1 comprises a vehicle body cooling structure 2 (see FIG. 2). The motorcycle 1 can be an on-road-type motorcycle comprising a cowling 3 that covers a forward region of the vehicle body. In FIG. 1, a front wheel 4, a front fork 5, steering handlebars 6, a fuel tank 7, a seat 8, a rear wheel 9, and an engine 10 are shown. These components can be arranged and configured in any suitable manner.

Figure 4:
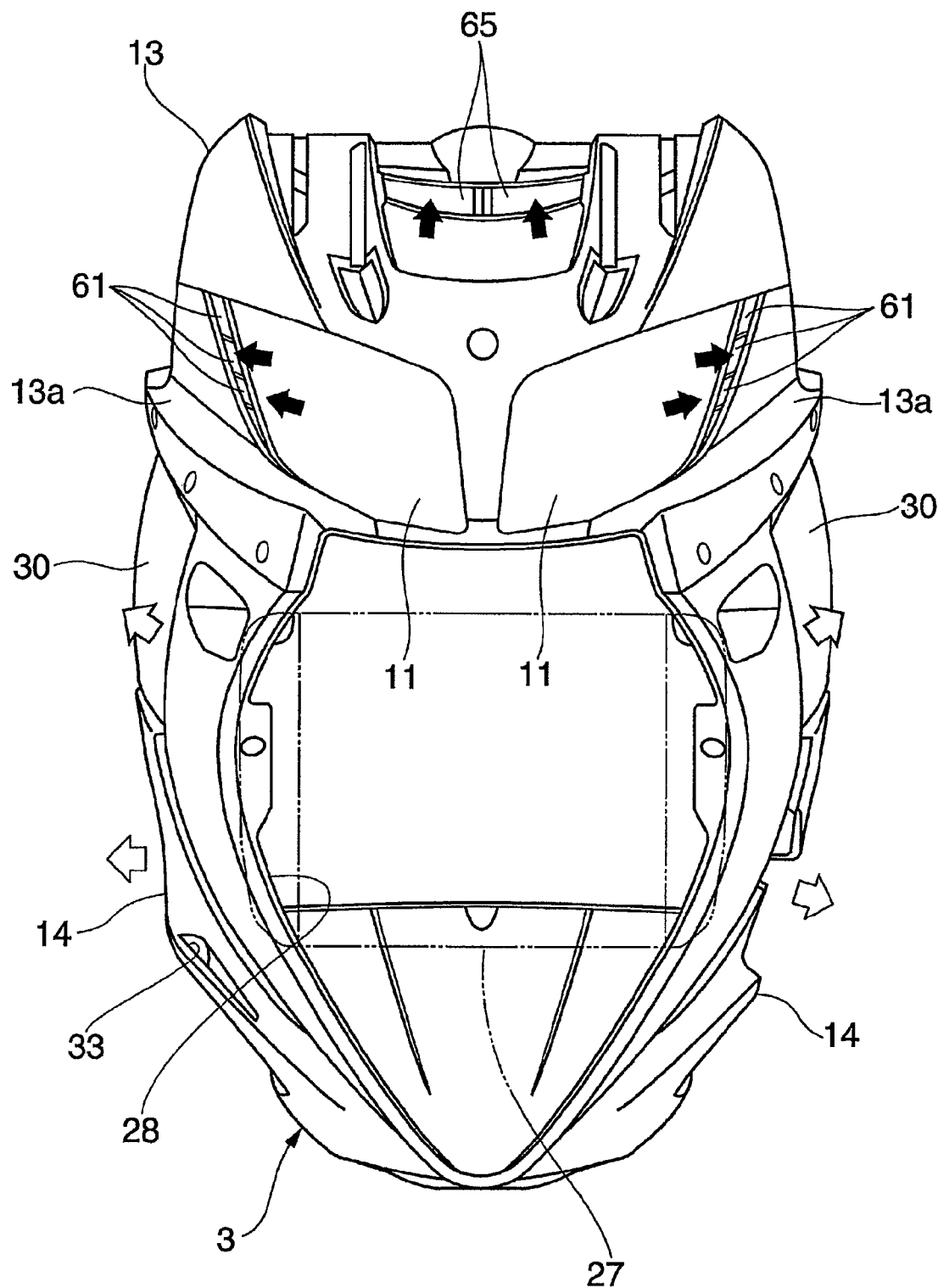
FIG. 4 is a front view of a cowling.
Figure 5:
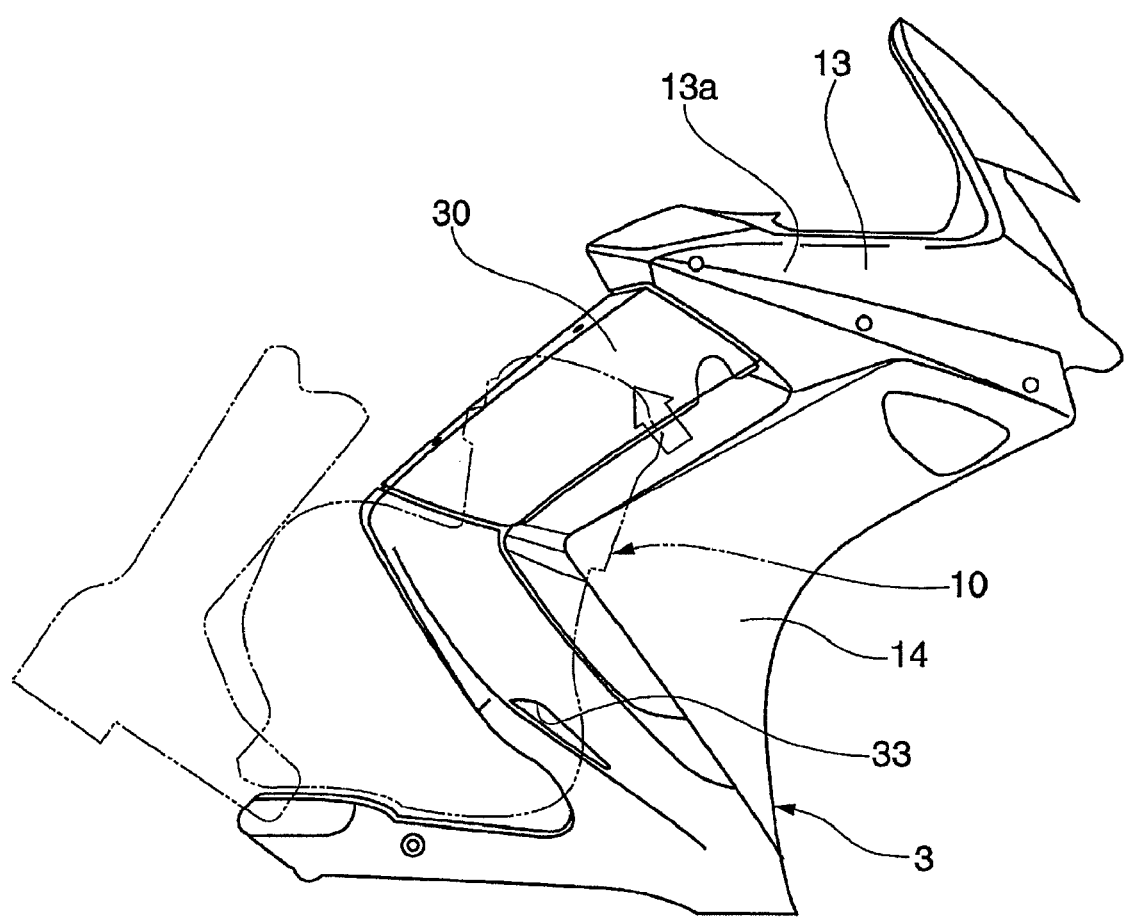
FIG. 5 is a right side view of the cowling.
Figure 6:
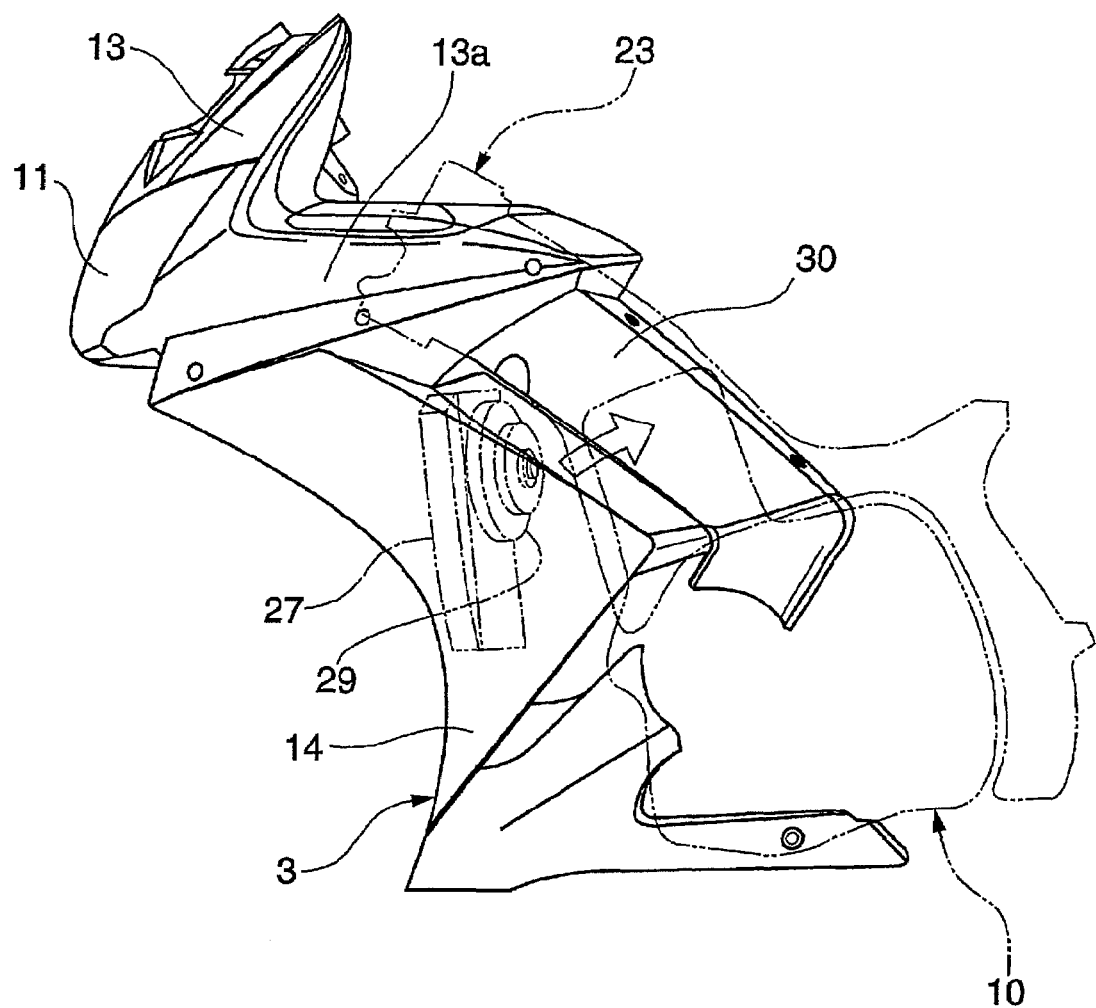
FIG. 6 is a left side view of the cowling.

With reference to FIGS. 4 through 6, the illustrated cowling 3 comprises a front cowling 13 that generally surrounds a pair of left and right head lights 11, 11 and that has a wind screen 12 (see FIGS. 1 and 2), a pair of left and right side cowlings 14, 14 extending downward from the lower end of the front cowling 13, and other components. One or more of these components can be integrally formed. In certain configurations, the cowling 3 defines a vehicle body cover.

Figure 2:
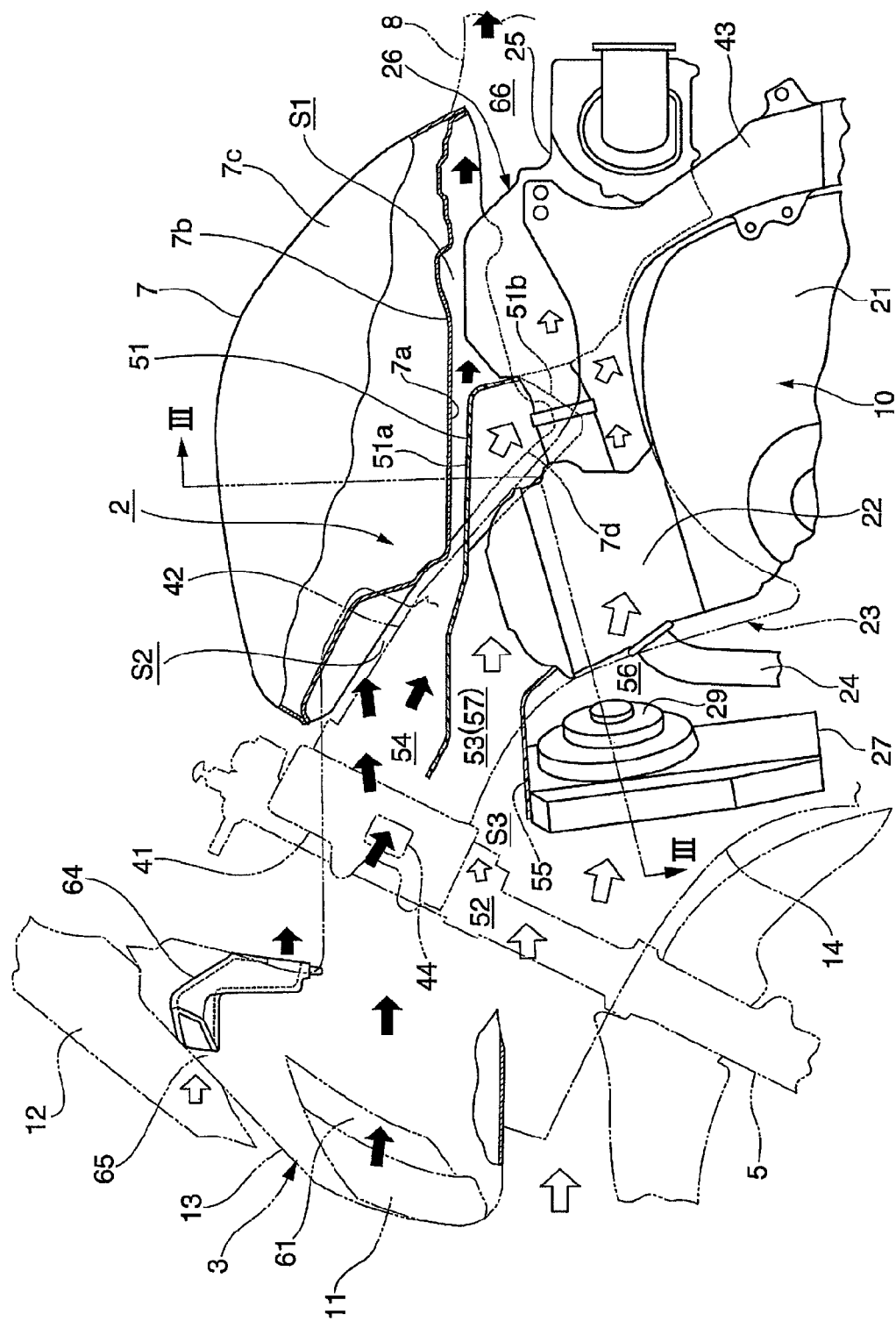
FIG. 2 is a simplified, enlarged and partially sectioned view of the motorcycle of FIG. 1 illustrating a portion of one configuration of a vehicle body cooling structure.

With reference to FIG. 4, the head lights 11 can be disposed at the front of the illustrated cowling and, in the vehicle width direction (i.e., the transverse direction), the head lights 11 can be positioned in a generally central portion of the front cowling 13. As illustrated in FIGS. 1 and 2, the head lights 11 preferably are located at substantially the same level as that of the fuel tank 7 in the height direction.

In the illustrated embodiment, the engine 10 is a water cooled 4-cycle multi-cylinder engine. As illustrated in FIG. 2, the engine 10 preferably comprises a crank case 21 and a cylinder 22 attached to the end of the front portion of the crank case 21 with respect to the vehicle body. The engine preferably is mounted on a vehicle body frame 23. The illustrated cylinder 22 extends diagonally upward to the front from the crank case 21 and is generally covered by the cowling 3 from the sides.

An exhaust pipe 24 is connected to the front part of the illustrated cylinder 22 while an air intake device 26 comprising an air cleaner 25 is connected to the rear part of the illustrated cylinder 22. Other configurations are possible. A radiator 27 can be positioned approximately in front of the exhaust pipe 24. The air cleaner 25 can be positioned between the rear part of the crank case 21 and the fuel tank 7. A clearance S1 through which air flows preferably is formed between the upper surface of the air cleaner 25 and a lower surface 7a of the fuel tank 7.

Figure 3:
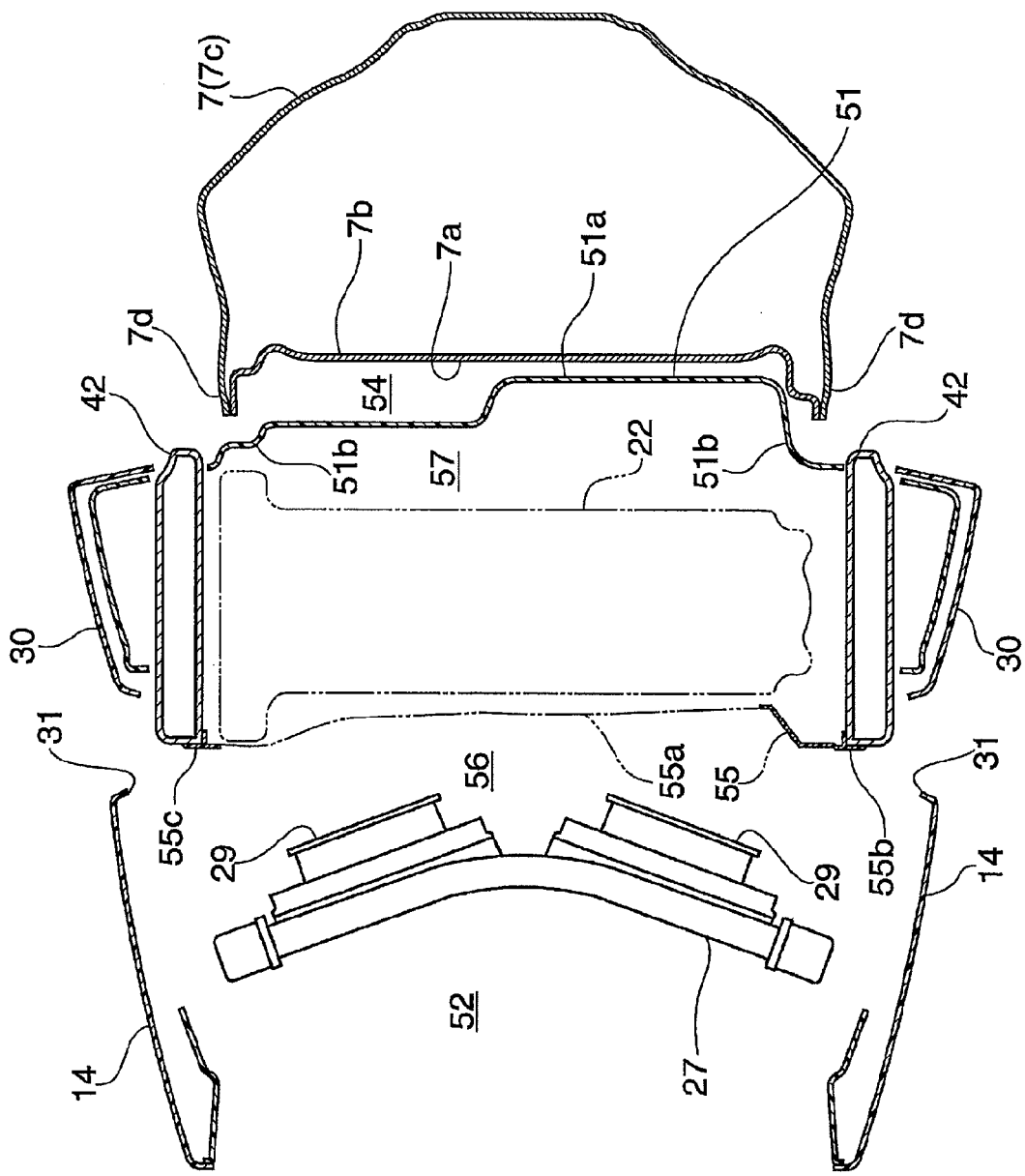
FIG. 3 is a sectioned view taken along a line III-III in FIG. 2.

As illustrated in FIG. 3, the radiator 27 preferably comprises a generally V-shaped configuration, which is open to the front with respect to the vehicle body in the plan view. As shown in FIG. 4, the illustrated radiator 27 is located behind a front opening 28 of the cowling 3. As can be seen from FIG. 3, a pair of electrically powered fans 29 can be provided behind the radiator 27 such that the fans 29 are substantially opposed to each other in the vehicle width direction. As shown in FIG. 3, the axes of the fans 29 are gradually inclined outward in the vehicle width direction to the rear of the vehicle. Thus, the fans 29 discharge air warmed by the radiator 27 diagonally sideways to the rear.

Figure 16:
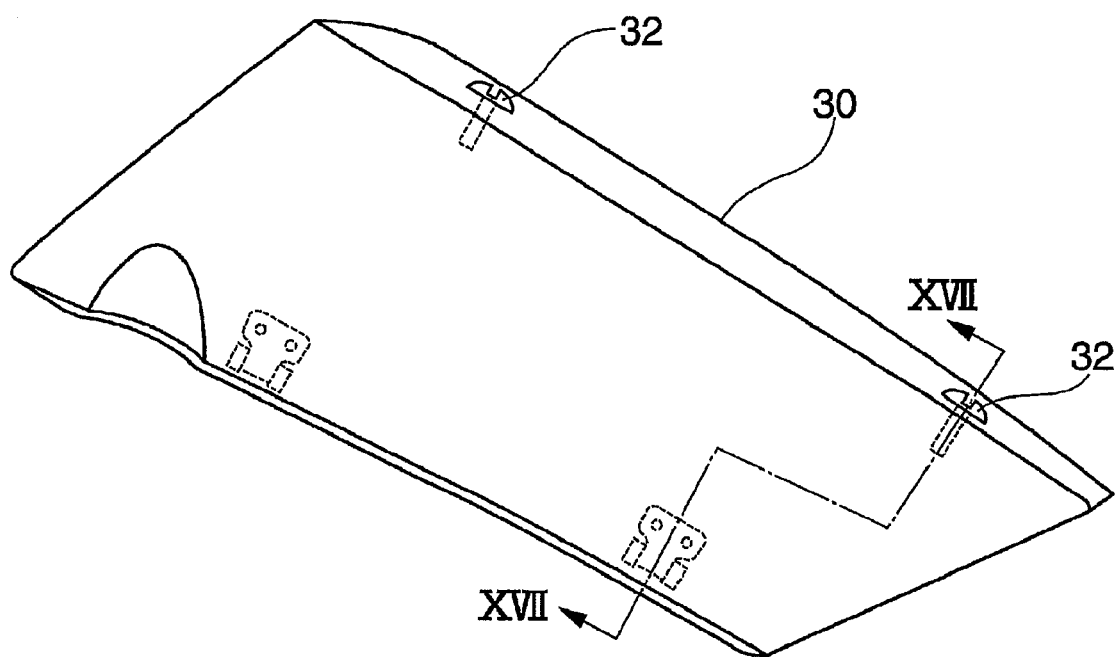
FIG. 16 is a side view of a side visor.
Figure 17:
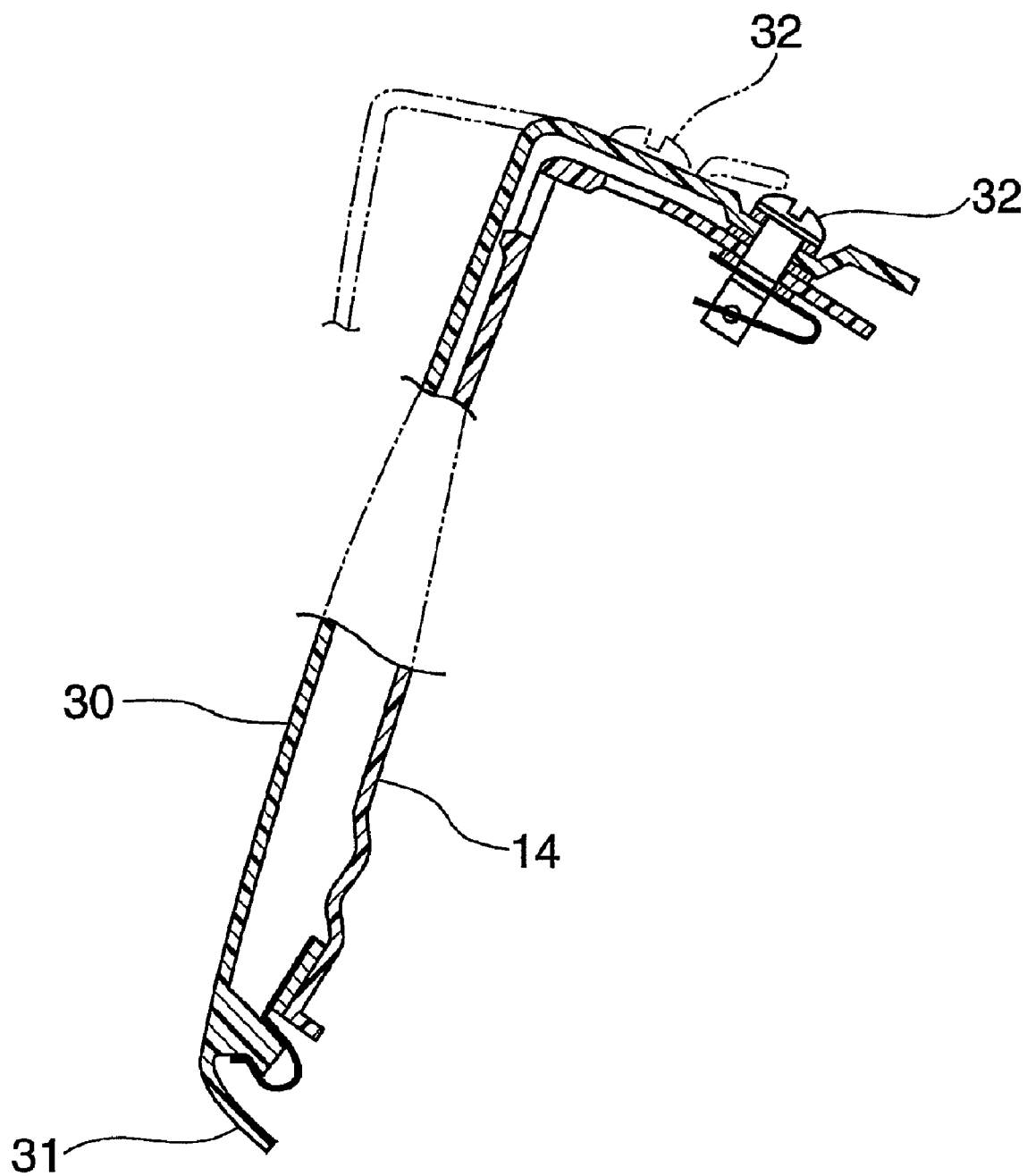
FIG. 17 is a sectioned view of the side visor taken along a line XVII-XVII in FIG. 16.

As indicated by white arrows in FIGS. 4 through 6, air discharged from the fans 29 preferably passes out of the cowling 3 through openings 31 (see FIG. 3) formed between the side cowlings 14 of the cowling 3 and side visors 30. As illustrated in FIGS. 16 and 17, the side visors 30 can be components separated from the side cowlings 14 and supported by the side cowlings 14 such that the side visors 30 can swing in the vehicle width direction around the ends of the openings 31.

As shown in FIG. 17, the inclination angle of the side visors 30 in the vertical direction can be switched between a first position at which the upper ends of the side visors 30 approach the side cowlings 14 as the inner position in the vehicle width direction and a second position at which the upper ends of the side visors 30 come to the position indicated by an alternate long and two short dashes line as the outer position in the vehicle width direction, by changing the tightening positions of fixing bolts 32 at the upper ends of the side visors 30. When the side visors 30 are located at the first position, airflow produced by running of the vehicle can easily contact the legs of the rider, eliminating discomfort caused by heat generated from the engine 10 in summer. In other words, the cooling airflow can be directed to the legs of the rider. When the side visors 30 are at the second position, the airflow does not easily reach the legs of the rider, reducing the likelihood that the legs of the rider will be cooled by the ram air in winter.

Figure 14:
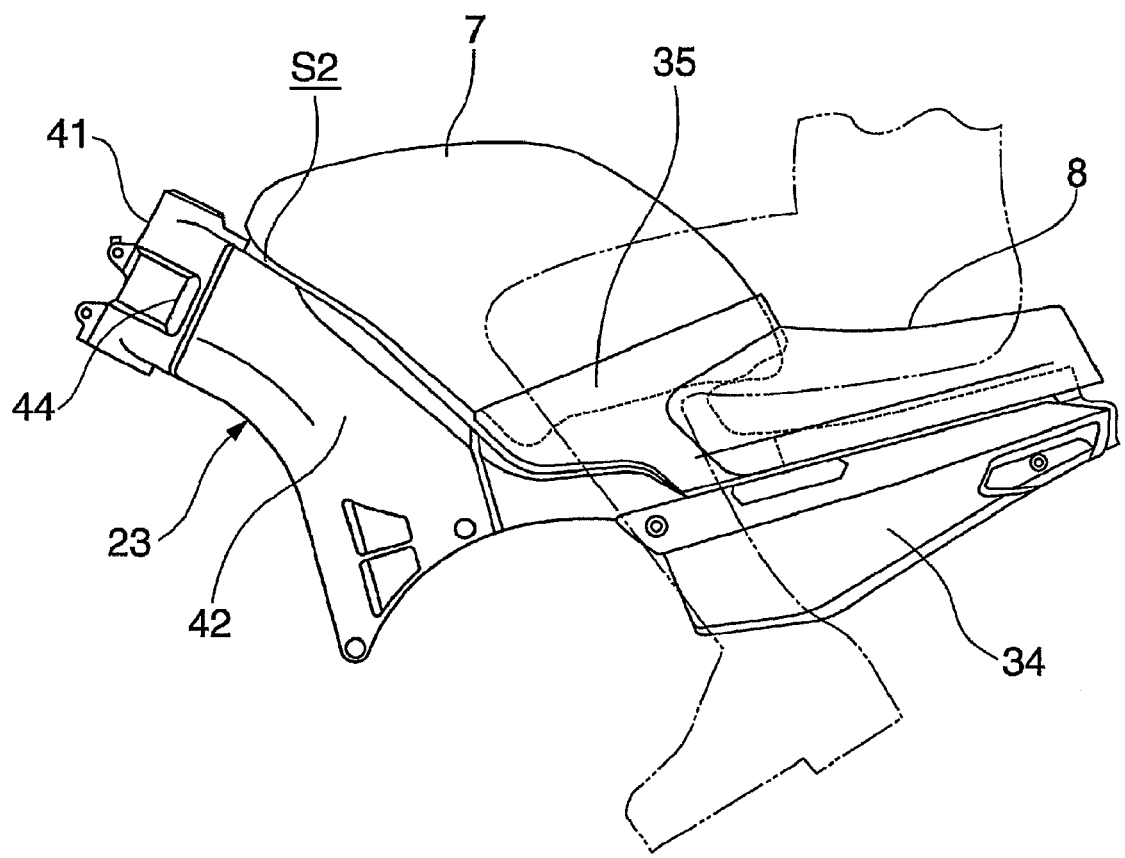
FIG. 14 is a side view of a side cowl.

A ventilation hole 33 (see FIGS. 4 and 5) preferably is provided to reduce or eliminate discomfort of the rider caused by heat from the engine 10. The ventilation hole 33 preferably is positioned in the lower right portion of the side cowling 14 with respect to the vehicle body. In addition, as illustrated in FIG. 14, heat insulating members 35 can be equipped on side covers 34 that generally cover the lower part of the seat 8 from the sides. The hole 33 can be located in front of the right toe of the rider so as to introduce the airflow produced by movement of the vehicle toward the right toe or foot. A similar construction can be used for the left side.

The insulating members 35 of the side covers 34 preferably are made of plastic material or the like (e.g., a material having a low thermal conductivity) and can be disposed below the fuel tank 7 to substantially cover both sides of the fuel tank 7 in the vehicle width direction as illustrated in FIG. 14. Thus, the legs of the rider are more likely contact the insulating member 35 rather than the lower portion of the fuel tank 7, which is more likely to experience a temperature increase during motorcycle operation.

As can be seen from FIGS. 2, 7, and 12 through 15, the vehicle body frame 23, which can support the engine 10, preferably comprises a head pipe 41 that supports the front fork 5 such that the front fork 5 can freely rotate. The frame 23 also preferably comprises left and right tank rails 42, 42 that extend diagonally downward to the rear from the head pipe 41. The frame 23 can comprises a rear arm bracket 43 that is provided at the rear end of each of the tank rails 42. The frame 23 also can comprise other components.

With reference to FIG. 2, the tank rails 42 preferably substantially cover the cylinder 22 from the sides and support the fuel tank 7. Thus, the fuel tank 7 can be mounted on the tank rails 42.

As shown in FIGS. 7, 12, 13, and 15, a cooling air introduction hole 44 extending through the tank rails 42 in the front-and-rear direction of the vehicle body. The cooling air introduction hole 44 preferably is formed at the front end of each of the tank rails 42, which connects with the head pipe 41. In other words, the cooling air introduction hole 44 preferably extends through a portion of the vehicle body frame 23 in the vicinity of both sides of the head pipe 41.

As shown in FIG. 2, the illustrated fuel tank 7 comprises an inside member 7b that defines the bottom of the fuel tank 7 and an outside member 7c that has a lower end opening that is closed by the inside member 7b. Other suitable fuel tank constructions also can be used. The fuel tank 7 can be positioned above the engine 10. As can be seen from FIGS. 2 and 14, a clearance S2 can be provided through which air flows. The clearance S2 can be formed between the front end of the fuel tank 7 and the tank rails 42. The clearance S2 preferably defines one embodiment of a cooling air introduction clearance. Other suitable constructions are possible.

As illustrated in FIGS. 2 and 3, a heat blocking member 51 can be positioned between the fuel tank 7 and the engine 10. Preferably, the heat blocking member 51 can comprise a portion of the vehicle body cooling structure 2. Advantageously, the vehicle body cooling structure 2 separates a cooling air passage 52 positioned between the fuel tank 7 and the engine 10 into two vertically separated regions. For example, the illustrated vehicle body cooling structure 2 defines a space formed between the fuel tank 7 and the heat blocking member and a second space formed between the heat blocking member and the engine 10.

Figure 8:
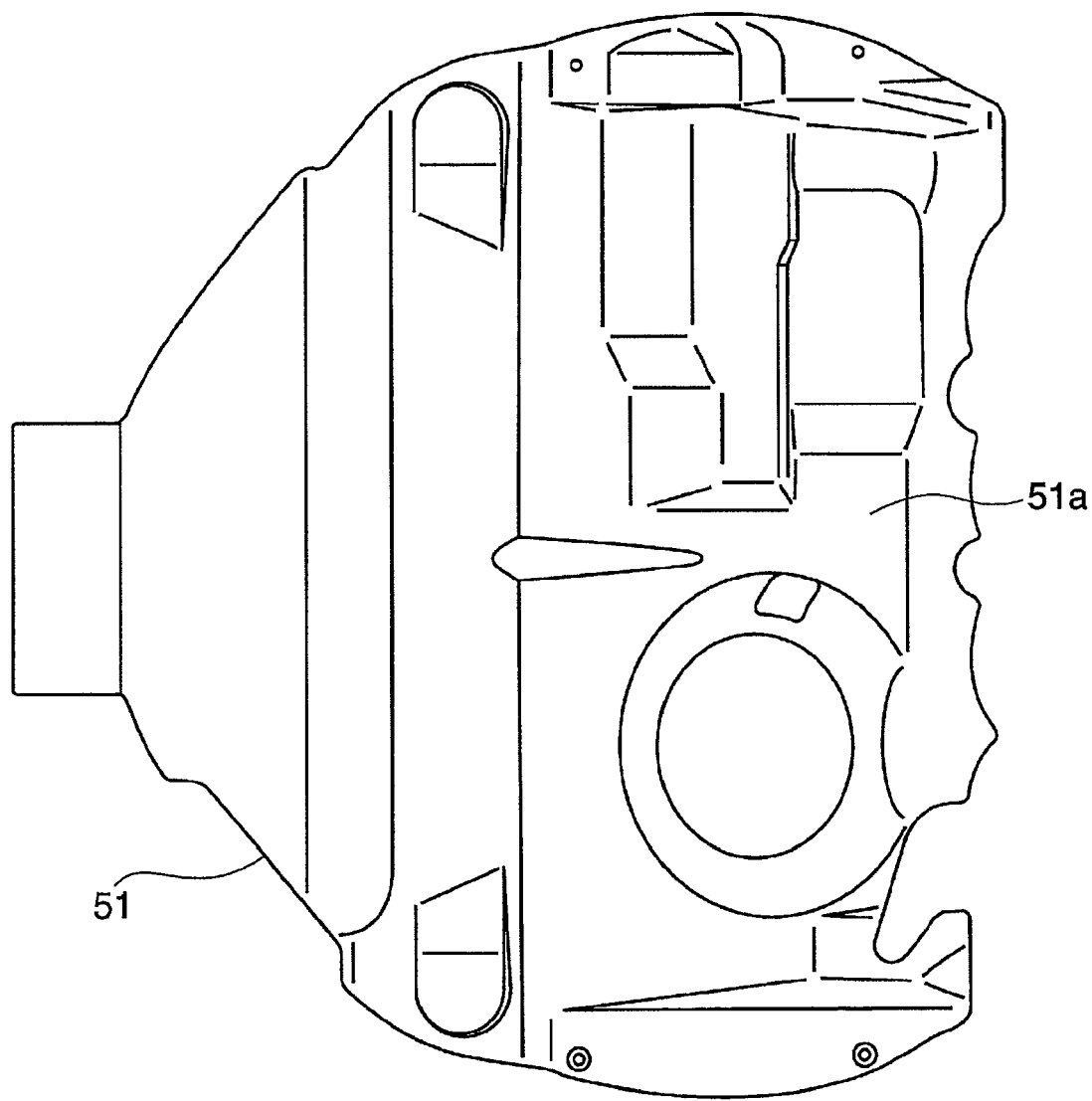
FIG. 8 is a plan view of a heat blocking member.
Figure 9:
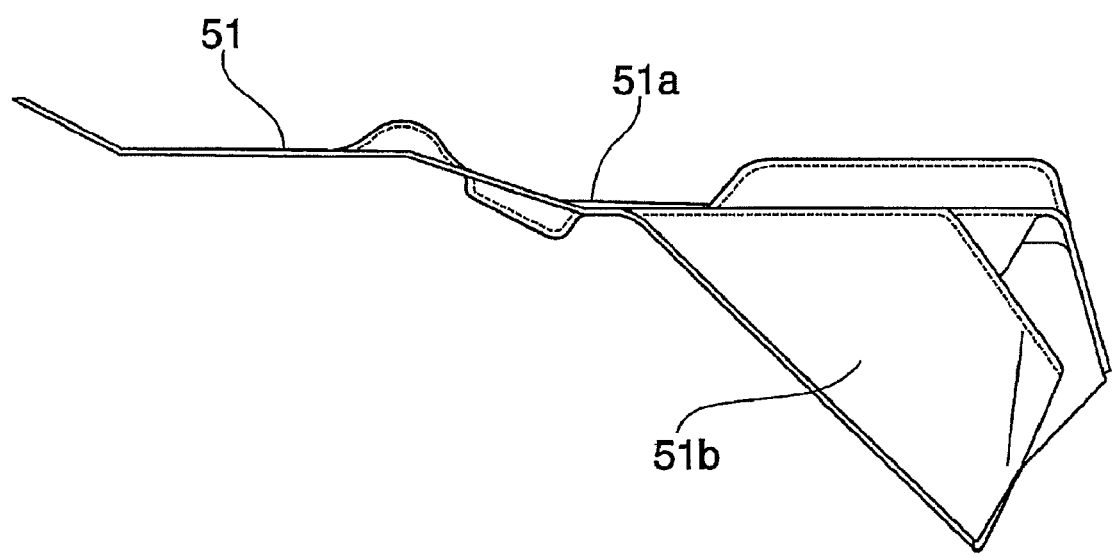
FIG. 9 is a side view of the heat blocking member.

With reference to FIGS. 8 and 9, the heat blocking member 51 can comprise a plate-shaped plastic component comprising a main plate 51a that extends generally in the horizontal direction and side plates 51b that extend downward from both lateral ends of the main plate 51a. In other words, the side plates 51b preferably are formed to the lateral sides of the vehicle. The heat blocking member 51 can be supported by the tank rails 42 via stays (not shown) while being positioned generally between the left and right tank rails 42, 42 (see FIG. 12). In the illustrated embodiment, the front end of the heat blocking member 51 preferably is positioned above the radiator 27 (see FIG. 2). As can be seen from FIGS. 8 and 12, the heat blocking member 51 preferably comprises has a planview shape similar to the inside plan-view shape of the tank rails 42, 42, and the width of the heat blocking member 51 in the vehicle width direction preferably gradually decreases toward the front of the vehicle body (i.e., the left side in FIG. 8). Thus, in a preferred configuration, the heat blocking member 51 spans substantially the entire distance between the tank rails 42, 42.

With reference to FIG. 2, the heat blocking member 51 preferably extends from generally vertically above the radiator 27 to at least a forward end of the air cleaner 25 in the front-and-rear direction of the vehicle body. The heat blocking member also preferably extends from the left tank rail 42 to the right tank rail 42 in the transverse or lateral direction of the vehicle. The heat blocking member 51 preferably can be inserted between the tank rails 42, 42 to cover the cylinder 22 and the front end of the crank case 21 from above. With the heat blocking member 51 mounted in this manner, the main plate 51a is opposed to the lower surface 7a of the fuel tank 7 and sides 7d (see FIG. 2) of the fuel tank that extend downward on the lateral sides of the fuel tank extend generally alongside a portion of the side plate 51b of the heat blocking member 51 (see FIG. 3).

When the fuel tank 7 is placed on the tank rails 42 to which the heat blocking member 51 is attached, the space between the fuel tank 7 and the engine 10 (cooling air passage 52) is separated into upper and lower parts by the heat blocking member 51. Thus, by attaching the heat blocking member 51, the cooling air passage 52 formed between the fuel tank 7 and the engine 10 is separated into an engine side cooling air passage 53 at the relatively lower position and a fuel tank side cooling air passage 54 positioned above the engine side cooling air passage 53.

The engine side cooling air passage 53 generally extends around the engine 10. In the illustrated configuration, the passage 53 is generally defined by the left and right tank rails 42, the heat blocking member 51, and other components. The components define walls of sorts around the cooling air passage 53. The engine side cooling air passage 53 introduces an airflow, which is produced by forward operation of the vehicle and which flows from the front opening 28 of the cowling 3 into the cowling 3 and toward the radiator 27 and the engine 10 as cooling air. In the illustrated embodiment, a separating member 55 divides the space between the upper end of the radiator 27 and the upper end of the cylinder 22 into the upper and lower portions. Thus, a lower passage 56 positioned below the separating member 55 and an upper passage 57 positioned above the separating member 55 are defined in an upstream region of the engine side cooling air passage 53.

Figure 10:
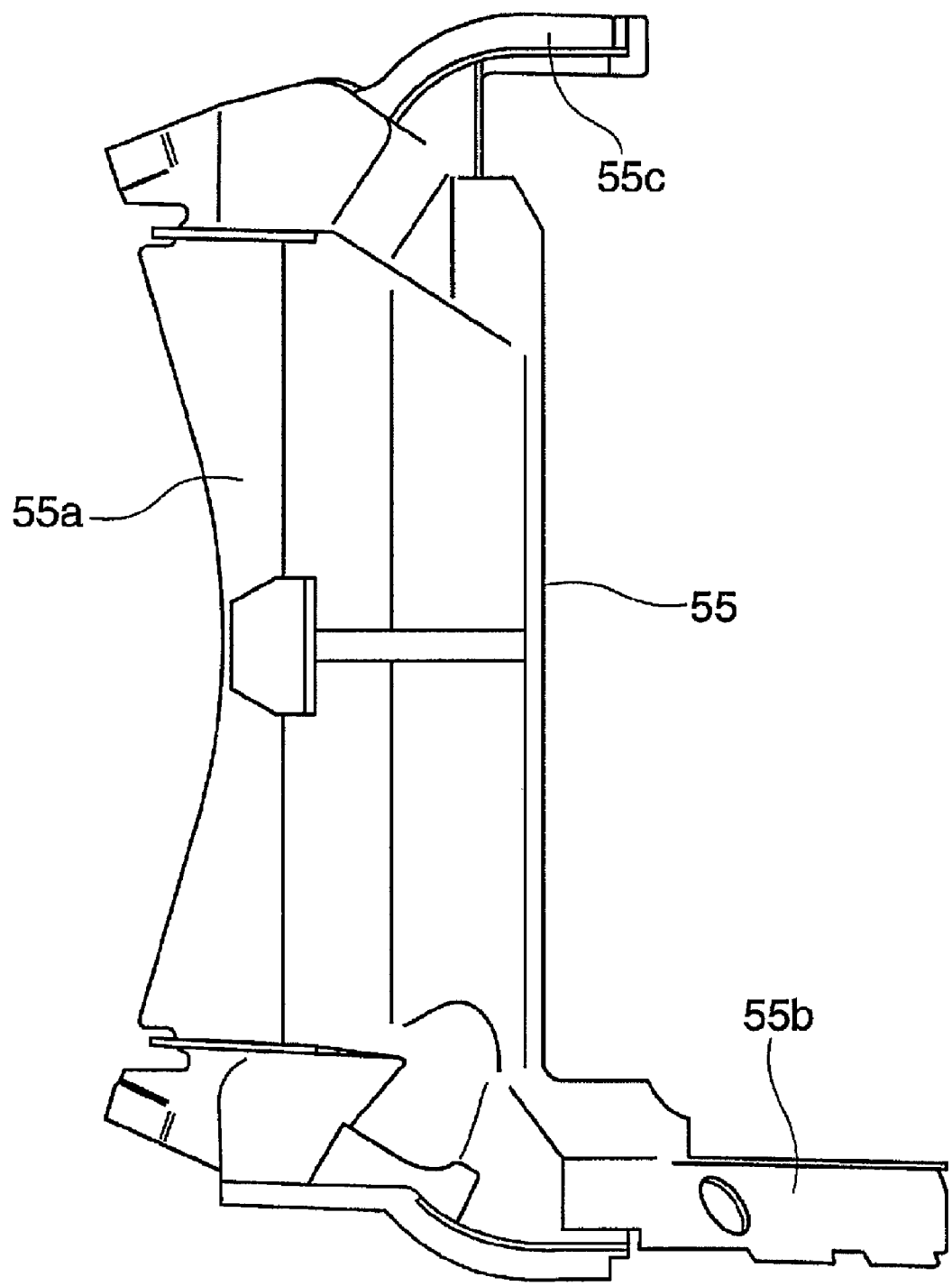
FIG. 10 is a plan view of a separating member.
Figure 11:
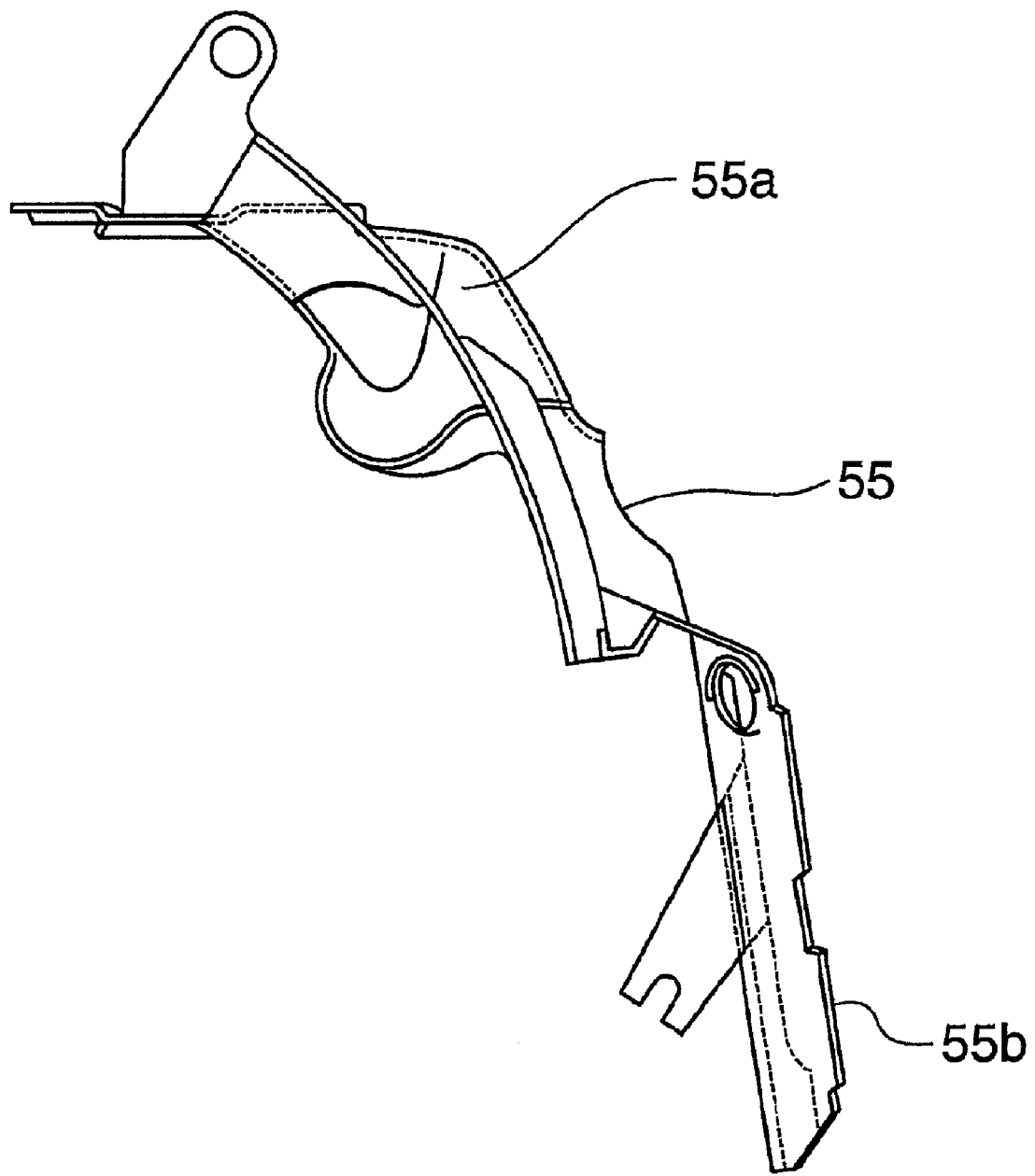
FIG. 11 is a side view of the separating member.
Figure 15:
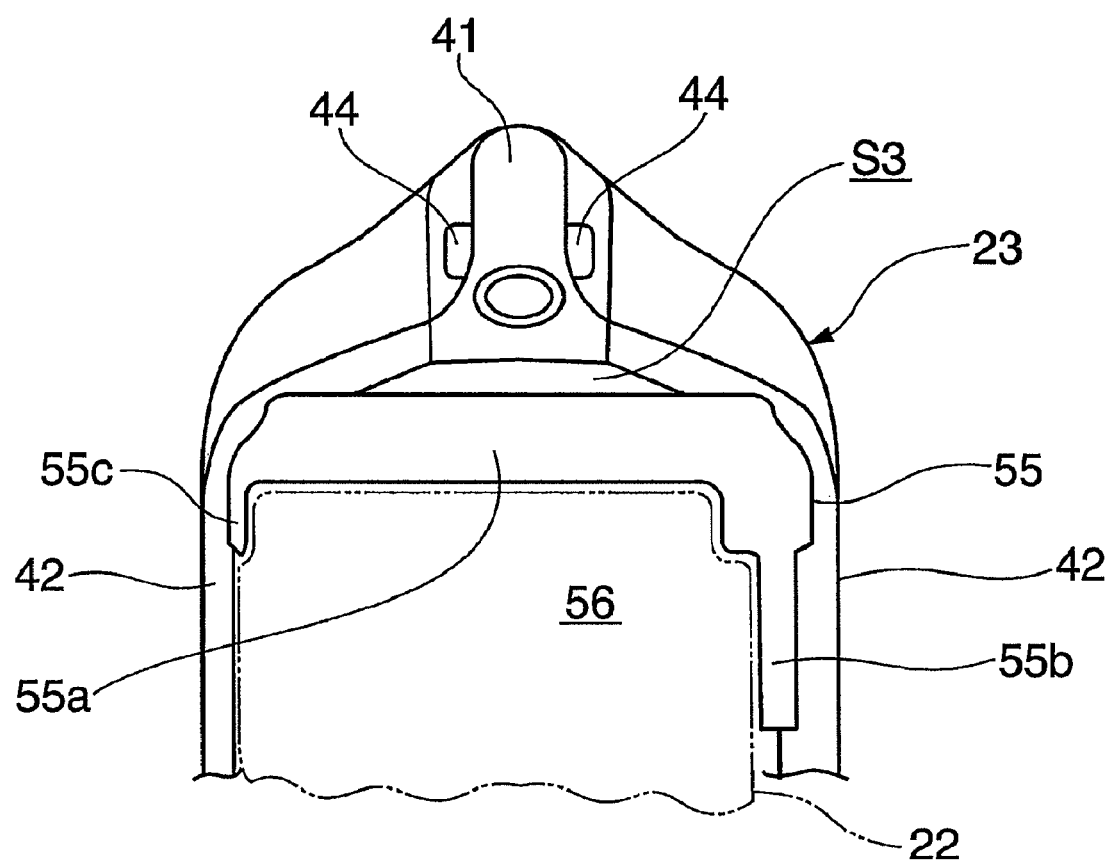
FIG. 15 is a perspective view of the separating member attached to the vehicle body frame.

With reference to FIGS. 10 and 11, the separating member 55 preferably is a generally plate-shaped component. The separating member 55 can be made of any suitable material, including but not limited to a plastic material. In a preferred configuration, the separating member 55 is formed of a plastic material such that the separating member 55 has a low thermal conductivity. In the illustrated configuration, the separating member 55 comprises a main plate 55a that generally extends between the radiator 27 and the cylinder 22 in the front-and-rear direction of the vehicle body. The illustrated separating member 55 also preferably extends along the radiator 27 from one lateral side to the other. Seal members 55b, 55c preferably extend downward from both lateral ends of the illustrated main plate 55a. As shown in FIG. 15, the seal members 55b, 55c close or substantially close the clearance between the tank rails 42 and the cylinder 22 from the front.

When the vehicle body cooling structure 2 features the separating member 55, substantially all of the air passing through the radiator 27 and contacting the front surface of the cylinder 22 within the lower passage 56 flows to the sides of the cylinder 22 since the upper area is generally closed by the separating member 55. As a result, the airflow flowing through the lower passage 56 is discharged chiefly through lower (center) discharge ports on the side cowlings 14.

Figure 13:
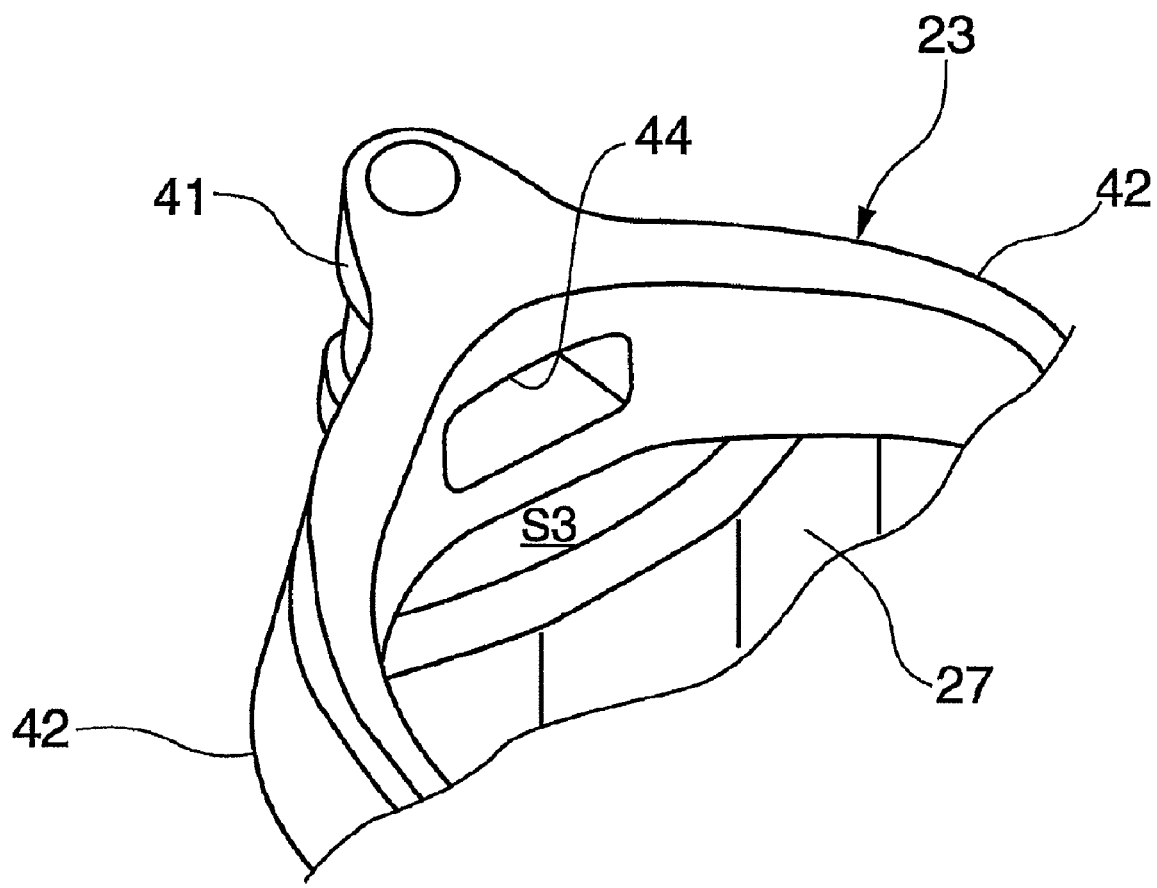
FIG. 13 is a perspective view of a structure of front ends of tank rails.

As illustrated in FIGS. 2, 13 and 15, the airflow produced by forward movement of the vehicle flows through the front opening 28 into the cowling 3 and a portion of the airflow passes above the radiator 27. This airflow flows through a clearance S3 defined between the separating member 55 (and the radiator 27, in the illustrated configuration) and the vehicle body frame 23. A portion of this airflow passes below the heat blocking member 51. This portion of the airflow cools the upper end and the sides of the cylinder 22 and passes between the cowling 3 and the side covers 34 to be discharged from the vehicle body.

Figure 7:
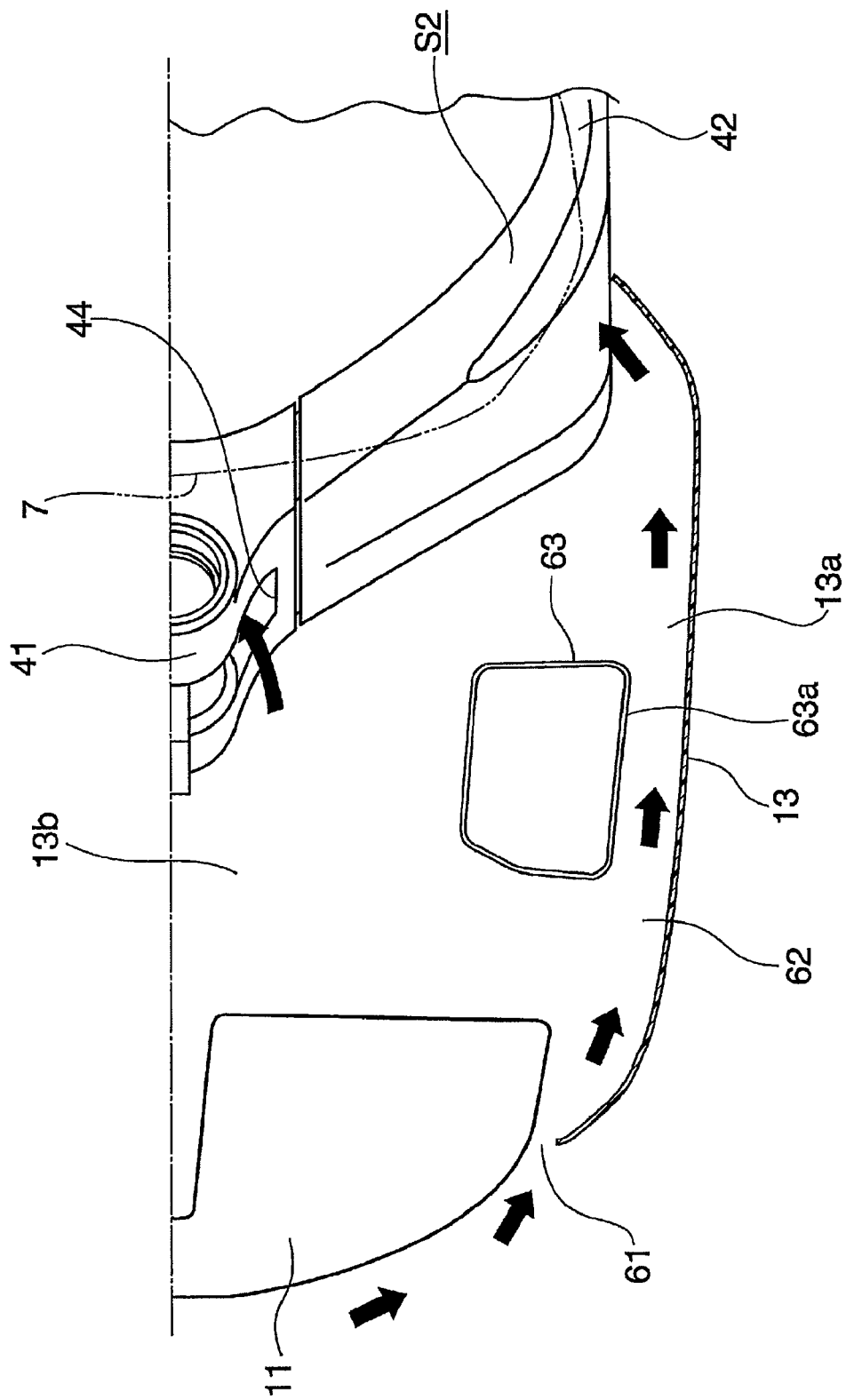
FIG. 7 is a sectioned view of an upstream area of a fuel tank side cooling air passage.
Figure 12:
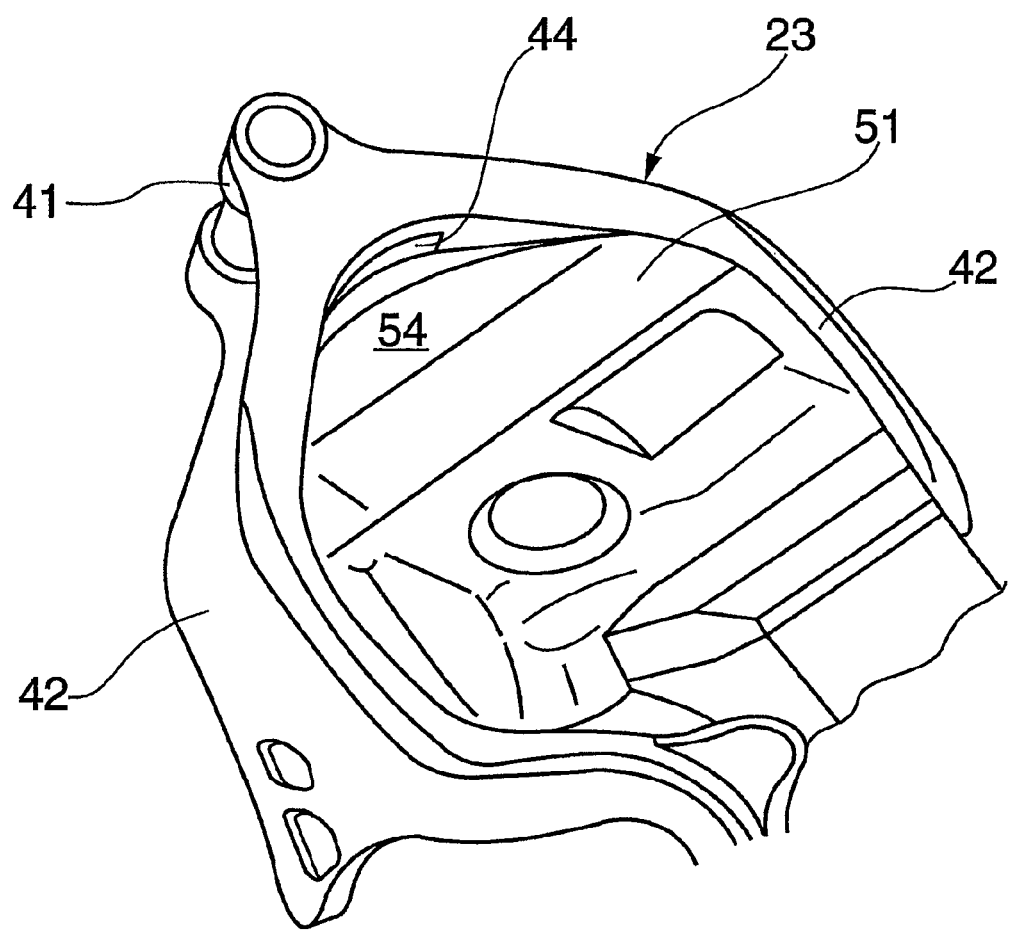
FIG. 12 is a perspective view of the heat blocking member attached to a vehicle body frame.

The front area of the fuel tank side cooling air passage 54 formed above the heat blocking member 51 preferably is defined by the heat blocking member 51 as the bottom and the tank rails 42 as the side walls as shown in FIG. 12. Thus, air flows into the fuel tank side cooling air passage 54 chiefly through the clearance S2 between the tank rails 42 and the fuel tank 7 and through the cooling air introduction hole 44 that can be defined through or adjacent to the tank rails 42. As shown in FIG. 7, the illustrated clearance S2 preferably communicates with both lateral sides 13a within the front cowling 13 and the illustrated cooling air introduction hole 44 preferably communicates with a central portion 13b within the front cowling 13.

As illustrated in FIG. 7, air introduction paths 62 extending toward the rear from first air introduction ports 61, which are formed on the front surface of the front cowling 13, are positioned to both lateral sides 13a within the illustrated front cowling 13. As shown in FIG. 4, the first air introduction ports 61 can be open to the front of the vehicle body at the boundaries between the outside of the two head lights 11 and the front cowling 13, i.e., on only the outer sides of the head lights 11. Other constructions can be used. As can be seen from FIGS. 2 and 4, in one preferred construction, the upper ends and lower ends of the first air introduction ports 61 are so positioned as to be substantially in line with the upper and lower ends of the head lights 11.

As illustrated in FIG. 7, the air introduction paths 62 can be generally defined by the inner surface of the front cowling 13, vertical walls 63a of housing boxes 63, and/or other components disposed within the front cowling 13. The rear ends of the illustrated air introduction paths 62 extend toward the clearance S2.

With reference to FIG. 2, airflow produced by forward movement of the vehicle is introduced through an air introduction duct 64 shown in FIG. 2 into the central portion 13b of the front cowling 13. The air introduction duct 64 preferably is disposed generally above the head lights 11 provided at the center of the front cowling 13. The air introduction duct 64 supplies airflow produced by forward movement of the vehicle to second air introduction ports 65 (see FIG. 4) formed in the upper region of the front cowling 13 in the front cowling 13.

As illustrated in FIG. 4, the illustrated second air introduction ports 65 are disposed generally at the center of the front surface of the front cowling 13 in the vehicle width direction and above the head lights 11. Preferably, the second air introduction ports 65 are directed to the front of the vehicle body. Thus, in one embodiment, the fuel tank side cooling air passage 54 communicates with the space in front of the vehicle body via the clearance S2, the cooling air introduction hole 44, the inside of the front cowling 13, and the first and second air introduction ports 61 and 65. The rearward end, i.e., the downstream end, of the fuel tank side cooling air passage 54 preferably communicates with a rear space 66 (see FIG. 2) that is generally surrounded by the seat 8 and the side covers 34. Thus, the airflow having reached the rear end of the fuel tank side cooling air passage 54 passes through the rear space 66 to be discharged to the rear of the vehicle body.

Thus, airflow produced by forward movement of the vehicle is introduced through the front opening 28 and the first and second air introduction ports 61 and 65. The airflow then flows into the engine side cooling air passage 53 and the fuel tank side cooling air passage 54 when the vehicle is running. In FIG. 2, the air flowing through the engine side cooling air passage 53 is indicated by white arrows, while the air passing through the fuel tank side cooling air passage 54 is indicated by black arrows. Since the engine side cooling air passage 53 and the fuel tank side cooling air passage 54 are separated from each other by the heat blocking member 51, neither the air flowing through the cooling air passage 53 nor the air flowing through the cooling air passage 54 flows from one cooling air passage to the other cooling air passage. Other constructions can be used; however, the illustrated configuration has been determined to be particularly advantageous in reducing the amount of heat absorbed from the engine by the fuel tank.

Thus, in the motorcycle 1 that has the above-described vehicle body cooling structure, relatively high-temperature air near the engine 10 passes through the engine side cooling air passage 53 to be discharged to the outside of the vehicle body. Thus, the fuel tank 7 can be cooled by air flowing through the fuel tank side cooling air passage 54 which is separated from the engine side cooling air passage 53 during operation of the vehicle. As explained above, a relatively low-temperature airflow can be introduced through the first and second air introduction ports 61 and 65 of the front cowling 13 into the fuel tank side cooling air passage 54. When the vehicle is running at a low speed or stops moving for a long period with the engine operating, air inside the fuel tank side cooling air passage 54 can function as thermal insulator. Accordingly, an increase of the temperature of the lower surface of the fuel tank 7 can be greatly reduced or even prevented during low speed or stationary operation.

In the illustrated configuration, the head lights 11 are provided at the front end and the laterally central portion of the front cowling 13 and the air introduction ports 61 open to the laterally outer sides of the head lights 11. Thus, the illustrated vehicle body cooling structure 2 can efficiently introduce cooling air into the first air introduction ports 61.

In one preferred configuration, the head lights 11 are disposed substantially at the same vertical height as the fuel tank 7 while the upper and lower ends of the first air introduction ports 61 are located substantially in line with the upper and lower ends of the head lights 11. In the illustrated vehicle body cooling structure 2, therefore, the first air introduction ports 61 can be positioned at generally the same level as the head lights 11. Thus the difference in height between the first air introduction ports 61 and the fuel tank 7 can be reduced. Accordingly, the vehicle body cooling structure 2 can smoothly introduce toward the lower surface of the fuel tank 7 and its vicinity a large volume of relatively low-temperature airflow produced by moving the vehicle.

According to the vehicle body cooling structure 2 in this embodiment, the head lights 11 are disposed at the front end of the vehicle in a laterally central portion of the front cowling 13 while the second air introduction ports 65 can be provided generally above the head lights. Thus, the illustrated construction provides an increased number of air introduction ports, including the second air introduction ports 65. Thus, an increase amount of air can be introduced when compared to a construction not having the second air introduction ports 65.

In the illustrated vehicle body cooling structure 2, air is introduced into the front cowling 13 through the air introduction duct 64 and air is introduced into the front cowling 13 through the second air introduction ports 65. The second air introduction ports 65 preferably are located generally above the head lights 11. Therefore, airflow can be introduced through the air introduction duct 64 toward the back of the front cowling 13, and thus negative pressure is not created behind the wind screen 12 during higher-speed operation. Such a configuration reduces the likelihood that relatively high-temperature air near the engine 10 rises due to a negative pressure that can be formed rearward of the screen. Therefore, the lower surface of the fuel tank 7 is maintained at a relatively lower temperature even during higher speed operation.

In the illustrated vehicle body cooling structure 2, the air introduction paths 62 that extend from the first air introduction ports 61 toward the rear are provided to both lateral sides of the vehicle body cover 3. The rearward portions of the air introduction paths 62 extend toward the clearance S2 for introducing cooling air, which clearance S2 is formed between the tank rails 42 and the fuel tank 7. In the vehicle body cooling structure 2, therefore, airflow produced by forward movement of the vehicle directly contacts the lower surface of the fuel tank 7.

The cooling air introduction hole 44 preferably extends through the tank rails 42 in the front-and-rear direction of the vehicle body. The cooling air introduction hole 44 can be formed in the vicinity of the portion of the tank rails 42 that is connected with the head pipe 41. In the vehicle body cooling structure 2, therefore, airflow produced by forward movement of the vehicle contacts the central portion of the lower surface of the fuel tank 7 in the vehicle width direction.

As illustrated, the radiator 27 preferably is positioned forward of the engine 10 and the front end of the heat blocking member 51 preferably is positioned generally above the radiator 27. In the illustrated vehicle body cooling structure 2, therefore, air having passed through the radiator 27 generally does not pass into the fuel tank side cooling air passage 54. Accordingly, only relatively low-temperature airflow is supplied to the fuel tank side cooling air passage 54.

The illustrated separating member 55 separates the space between the upper end of the radiator 27 and the upper part of the engine 10 into the upper and lower parts. The engine side cooling air passage 53 comprises the lower passage 56, which is positioned below the separating member 55, and the upper passage 57, which is positioned above the separating member 55. In the illustrated vehicle body cooling structure 2, therefore, relatively high-temperature airflow that has passed through the radiator 27 is supplied to the lower passage 56 of the engine side cooling air passage 53 while relatively low-temperature air entering from the space between the radiator 27 and the heat blocking member 51 flows through the upper passage 57. Since the temperature of the air within the upper passage 57 is relatively low, the temperature of the air within the fuel tank side cooling air passage 54 adjacent to the upper passage 57 can be further reduced.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A motorcycle, the motorcycle comprising an engine, the engine comprising a cylinder that extends generally vertically, an air intake device being connected to the engine and supplying air to the engine for combustion in the cylinder, the air intake device comprising an air cleaner, a fuel tank disposed generally above the engine, a cooling air passage extending between the engine and the fuel tank in the front-and-rear direction, and a vehicle body cover covering a forward portion of the motorcycle and the engine, a heat blocking member covering an upper part of the engine, the heat blocking member being positioned between the cylinder and the fuel tank and being spaced apart from the air cleaner in a front-to-rear direction of the motorcycle, and the cooling air passage being separated into an engine side cooling air passage and a fuel tank side cooling air passage by the heat blocking member.

2. The motorcycle of claim 1, wherein air introduction ports are provided on a front surface of the vehicle body cover and the fuel tank side cooling air passage communicates with the air introduction ports.

3. The motorcycle according to claim 2, wherein head lights are provided at a laterally central portion of the front end of the vehicle body cover and the air introduction ports comprise first air introduction ports that are positioned along the laterally outer sides of the head lights.

4. The motorcycle according to claim 3, wherein the head lights are positioned substantially at the same vertical height as at least a portion of the fuel tank and upper and lower edges of the first air introduction ports are generally aligned with upper and lower edges of the head lights.

5. The motorcycle according to claim 3, wherein the motorcycle further comprises a left tank rail and a right tank rail, the fuel tank is mounted to the right and left tank rails, air introduction paths extending from the first air introduction ports toward the rear are positioned adjacent to laterally outer sides of the vehicle body cover; and rear ends of the air introduction paths extend toward a clearance formed between the right and left tank rails and the fuel tank.

6. The motorcycle according to claim 3, wherein the motorcycle further comprises a head pipe, a left tank rail and a right tank rail that extend rearward from the head pipe, the fuel tank being mounted to the left and right tank rails, and a cooling air introduction hole extends through the tank rails in the front-and-rear direction of the vehicle body, the air introduction hole being formed proximate a portion of the left and right tank rails that is connected with the head pipe.

7. The motorcycle according to claim 2, wherein head lights are provided at a laterally central portion of the front end of the vehicle body cover and the air introduction ports comprise second air introduction ports disposed generally above the head lights.

8. The motorcycle according to claim 7, wherein the vehicle body cover comprises a front cowling and an air introduction duct for guiding airflow generated by forward movement of the vehicle and introduced through the second air introduction ports into the front cowling is provided on the front cowling above the head lights.

9. The motorcycle according to claim 8, further comprising a separating member that separates a space between an upper end of the radiator and an upper part of the engine into upper and lower parts and the engine side cooling air passage comprises a lower passage positioned below the separating member and an upper passage positioned above the separating member.

10. The motorcycle according to claim 1, wherein a radiator is positioned forward of the engine and a front end of the heat blocking member is positioned generally above the radiator.

11. A vehicle body cooling structure for a motorcycle, the motorcycle comprising an engine, a fuel tank disposed generally above the engine, a cooling air passage extending between the engine and the fuel tank in the front-and-rear direction, and a vehicle body cover covering a forward portion of the motorcycle and the engine, the vehicle body cover comprising a front cowling, a heat blocking member covering an upper part of the engine and the cooling air passage being separated into an engine side cooling air passage and a fuel tank side cooling air passage by the heat blocking member, air introduction ports being provided on a front surface of the vehicle body cover and the fuel tank side cooling air passage communicating with the air introduction ports, head lights being provided at a laterally central portion of the front end of the vehicle body cover and the air introduction ports comprising second air introduction ports disposed generally above the head lights, an air introduction duct for guiding airflow generated by forward movement of the vehicle and introduced through the second air introduction ports into the front cowling being provided on the front cowling above the head lights, and a separating member that separates a space between an upper end of the radiator and an upper part of the engine into upper and lower parts and the engine side cooling air passage comprising a lower passage positioned below the separating member and an upper passage positioned above the separating member.

12. A motorcycle comprising the vehicle body cooling structure of claim 11.

* * * * *